United States Patent Office 2,790,345
Patented Apr. 30, 1957

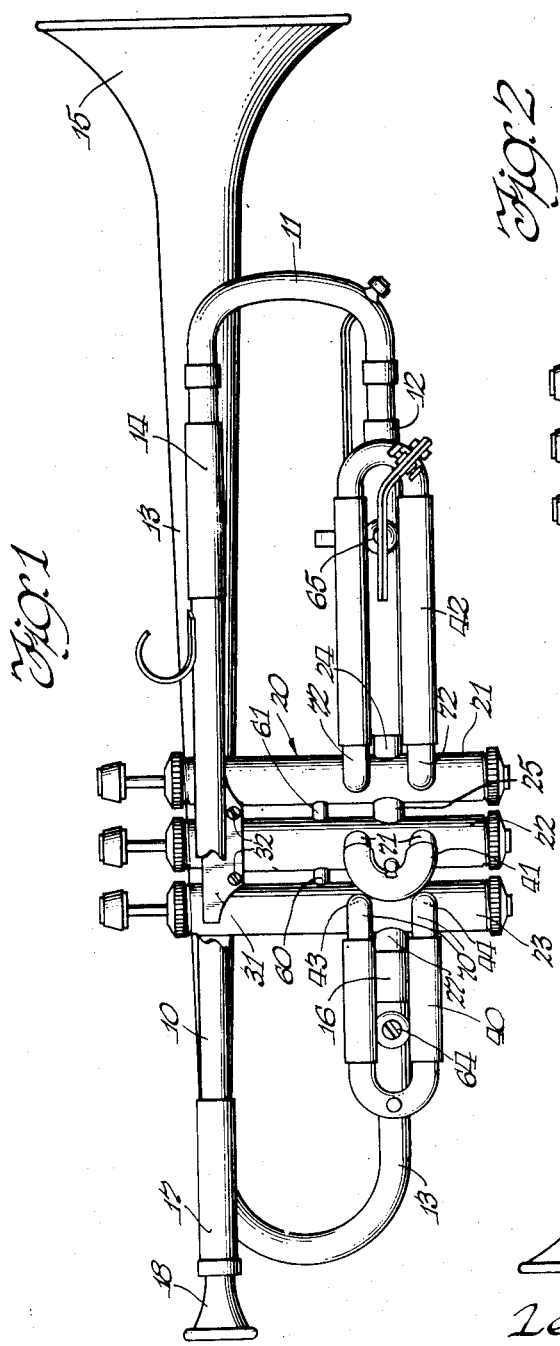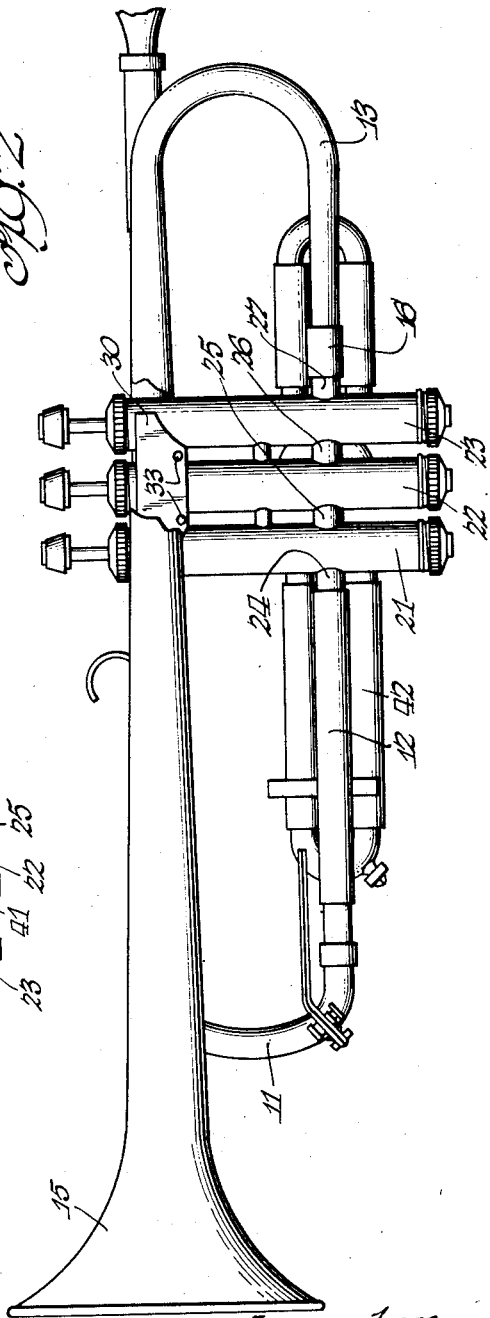

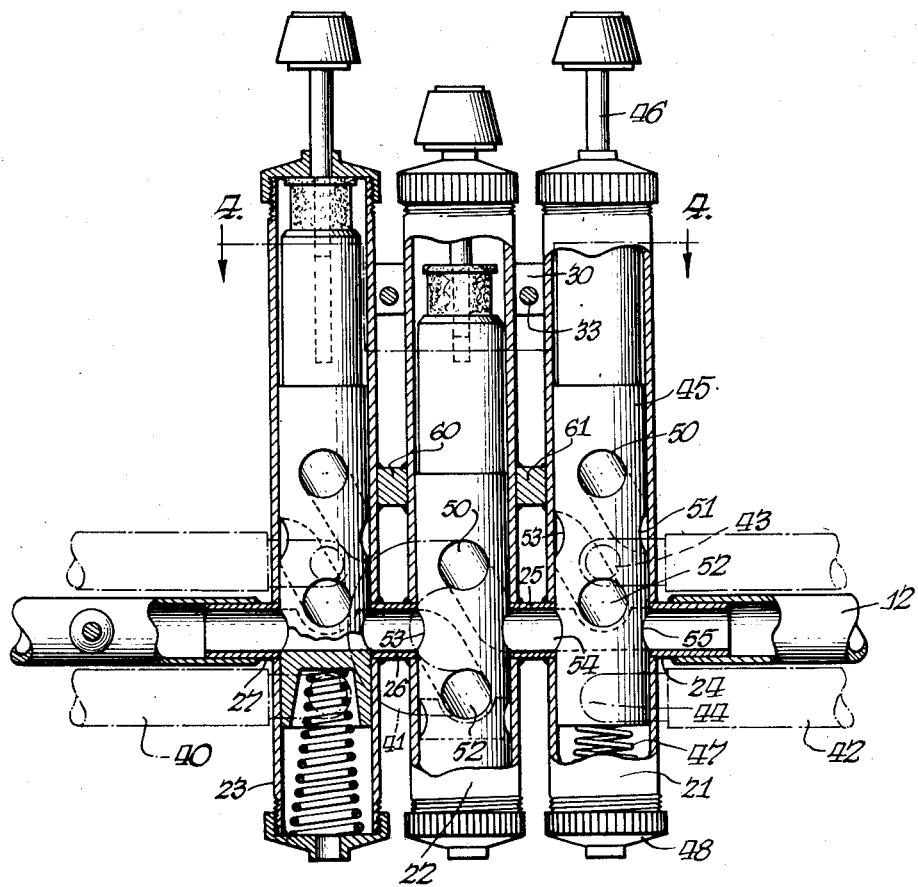
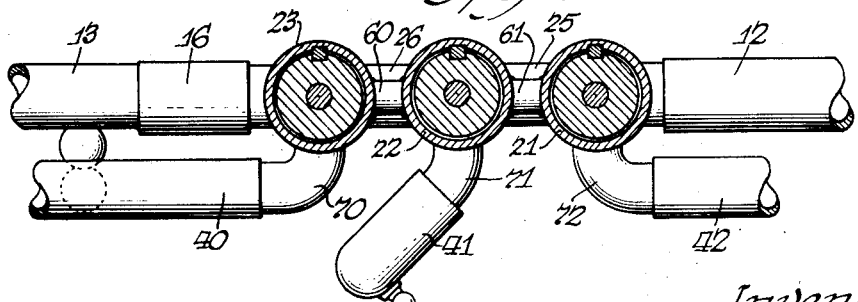

2,790,345

VALVED WIND INSTRUMENT

Leland B. Greenleaf, Elkhart, Ind., assignor to C. G. Conn Ltd., Elkhart, Ind., a corporation of Indiana Application December 2, 1953, Serial No. 395,745

4 Claims. (Cl. 84—388)

This invention relates to valved wind instruments, particularly trumpets and cornets.

It is a primary object of the invention to provide a valve casing assembly in which the individual casings and valves are completely interchangeable one with the other.

It is another object to provide a simplified horn construction made from small easily processed parts or sub-assemblies on which any necessary soldering and buffing or finishing may be readily performed, and subsequently assembled simply by mechanical fasteners, such as screws.

A further object is the provision of uniform interchangeable parts which may be utilized in making either trumpets or cornets by merely assembling the common parts with different bell and mouth piece units. These and other objects will become apparent from the following description when read in conjunction with the accompanying drawings, which are used only to illustrate the invention.

In the drawings:

Figure 1 is a right side view of a cornet illustrating my invention.

Figure 2 is a left side view of the cornet shown in Figure 1.

Figure 3 is an elevational view of a valve casing assembly, with the casing partially broken away to show the construction of the valves.

Figure 4 is a sectional view taken along the line 4—4 of Figure 3.

Conventional valved wind instruments are equipped with reciprocating valves, each of which is different in construction, to accommodate different locations of the pipe connections to the valve casings. It is necessary, therefore, in manufacturing a three-valve horn of such construction, to prepare three different valve casings and three different piston valves for each instrument. The necessity for utilizing different casing and piston valve constructions for each of the valves greatly complicates both manufacture and repair of the instruments, since each of the different casing and valve constructions must be made and kept in stock.

The horn of this invention contemplates the employment of three identical valve casings and complementary identical piston valves. Each casing has four openings therein which connect to pipes or tubing soldered thereto, and each opening is of the same size and in the same location in each casing. The valve casing assembly is made up of three such connected casings housing their valves, and includes short pipes connecting adjacent cases, and knuckle tubes to which U-tubing by-passes are connected. The casing assembly is built up separately with all soldering and polishing being done on this casing unit before assembly with the bell, slide U-tube and mouth piece unit. To assemble the horn it is necessary merely to telescope the end of the bell tube unit, which also has been previously polished, onto the exit pipe of the last valve of the valve casing assembly, and to slide a sleeve over the entrance pipe of the first valve of the casing assembly into which sleeve one leg of the tuning slide is telescoped. The mouth piece and its tubing then is connected to the other leg of the tuning slide on the side of the valve casing assembly opposite the bell tube unit. Both the mouth piece tube and the bell tube are provided with brackets soldered to inner sides thereof adjacent the valve casing, which brackets are adapted to embrace said casing, as the brackets are brought together by means of screws, to unite the bell and mouth piece units with the valve casing assembly. Thus, by a simple assemblying operation the completely prepared sub-assemblies are fabricated into the finished instrument.

Referring now to Figures 1 and 2, the numeral 10 indicates the mouth piece tube having mouth piece 18 connected to one end thereof by means of sleeve 17, and having one leg of the tuning slide 11 connected to the other end by means of sleeve 14. This assembly is mounted on one side of the valve casing assembly 20 and the other leg of the slide 11 is connetced to the valve casing through tube 12 which telescopes over the short pipe 24 which is integrally connected to the first valve casing 21. The bell 15 and its curved bell tubing 13 forming an integral part thereof, is mounted on the opposite side of the valve casing 20 and joined to the short pipe 27 of the third valve casing 23 by means of sleeve 16. The valve casings are designated "first," "second," and "third" in the order air from the mouth pieces reaches them.

It will be noted that the valve casing is of standard construction except for the location of the openings therein and the location of the corresponding ports in the valves slidably disposed herein. Each cylindrical casing has four circular openings cut through its side wall, one pair diametrically opposed, and another pair located at 90° to the first pair equally spaced, one above and one below said first pair. In the valve casing assembly, the diametrically opposed openings of adjacent casings are connected by short pipes 25 and 26, soldered to the casings they connect. Casings 21, 22 and 23 are also rigidly interconnected by means of studs 60 and 61 soldered to adjacent casings. Entry pipe 24 and exit pipe 27 connect the first and third valve casings 21 and 23 respectively to mouth piece tube 12 and bell tube 13. Tube 13 is connected to the short pipe 27 by means of a sleeve 16. The other pair of openings 43, 44 in the casings lead through knuckle tubes 70, 71 and 72 to U-tube tuning slides 40, 41 and 42, which are of conventional construction. The tuning slides all project from the same side of the casing assembly but are directed toward the mouth piece in the case of tubes 40 and 41 and toward the bell in the case of tube 42, generally parallel with the long axis of the horn.

The details of the conventional portions of the valve structure shown in Figures 3 and 4 will not be described in detail since they are well known. Reciprocating piston valve 45 is mounted within the casing and is keyed thereto as shown in Figure 4 to prevent rotation of the valve therein. The valve is depressed by pressing the stem 46 against the coil spring 47 seated upon the inner face of bottom cap 48.

Each of casing 21, 22 and 23 and each of the piston valves 45 are identical, the casings being identified by different numerals only to designate their location with respect to each other and other parts of the horn. Only one valve and casing assembly will be described. The piston valve has three generally cylindrical bores extending therethrough. The lower bore, terminating in diametrically opposed ports 54 and 55 (see valve 21 of Figure 3) is normal to the axis of the valve and when the valve is not depressed, port 55 is in communication with pipe 24 and port 54 is in communication with pipe 25 to provide a straight channel between said pipes through said valve. A center curved bore terminates in a port 52, at 90° to ports 54 and 55, and a port 53, directly above and aligned with port 54. An upper curved bore, above the center bore, terminates in a port 50, at 90° to ports 54 and 55, and port 51, directly above and aligned with port 55.

With the valve in normal, that is, non-depressed position, the ports of the center and upper bores are not in communication with any of the external pipes or tubes comprising part of the horn, but are blocked off by the valve casing. When the valve is depressed against spring 47 it assumes the position shown in the center casing 22 of Figure 3. Port 51 of the upper bore then is in communication with pipe 25, and port 50, at the opposite extremity of said bore, joins one leg of the U-tube tuning slide 41. Port 52 of the center bore is in communication with the other leg of the U-tube tuning slide 41, and port 53 thereof connects with pipe 26. Thus, a clear channel is provided via the upper and center bores of the valve from pipe 25 through the U tube 41 to pipe 26. In like manner valves 21 and 23 may be depressed to channel air through U-tubes 42 and 40 respectively. When the valves are not depressed air from the mouth piece will flow directly from one casing to the other through the lower bore of the valves.

To fasten the mouth piece and bell tube units securely to the valve casing assembly unit, a bracket 30 is soldered to the tube 10 and a similar bracket 31 is soldered to the tube 13. These brackets, best shown in Figures 1 and 2, are curved to conform to and embrace valve casings 21, 22 and 23 as a unit. Brackets 30 and 31 are connected by screws 32 which extend through openings in bracket 31 and screw into aligned tapped holes 33 in bracket 30. By tightening the screws the tube assemblies on either side of the valve casing are brought into firm contact with the latter to hold the parts securely together.

Additional fasteners (not shown) of the conventional type may be employed at points spaced outwardly from the valve casing assembly 20 to rigidly connect parallel-spaced tubes 10 and 13. These fasteners may take the form of complementary overlapping studs soldered to the respective tubes at right angles thereto and secured to each other by screws. Similar screw fasteners may be employed to fasten the longer tuner tubes 40 and 42 to tubes 13 and 12 respectively as indicated at 64 and 65.

In operating the horn, air entering the mouth piece 18 follows the tubing 13, the slide 11 and the tube 12 to the entry port of the valve casing 21. If none of the valves is depressed, the air will pass directly in a straight line through short aligned pipes 24, 25, 26 and 27 via the ports 55 and 54 of each valve. By depressing the valve, air may be diverted through the U-tube tuning slides 40, 41 or 42 to cause the tone to be reduced 2, 1 or 3 half steps respectively. The air exits from the valve casing assembly 20 through pipe 27 and out through bell tube 13 and bell 15.

By carrying out all soldering operations on the tubes prior to assembly with the valve casing, buffing and polishing of the parts is greatly facilitated because they are exposed and readily accessible. If it is necessary to assemble the various parts by soldering, as in prior constructions, of course polishing must be done after assembly because soldering causes some surface disfigurement of the parts.

It may be seen from the above description that the valve casing assembly of this invention constitutes a practical answer to the problem of interchangeable valves and valve casings. Interchangeability has been accomplished without complicating the structure of the horn or making it more bulky or cumbersome to handle. Furthermore, it is possible to utilize the same valve casing assembly for cornets or trumpets. Only the bell and mouth piece tube assemblies need be changed.

The horn construction disclosed also makes possible assembly of valve casing units to the bell and its tubing on one side of the casing, and to the mouth piece and its tubing on the other side thereof by telescoping or sliding tube connections and the provision of brackets that may be joined simply by means of screws. In this way all soldering is avoided during final assembly which makes possible polishing of the parts at the sub-assembly stage of manufacture.

I claim:

1. A valved wind instrument including a valve casing unit, a communicating bell tubing unit adapted to be mounted on one side of said valve casing unit, and a communicating mouth piece tubing unit adapted to be mounted on the opposite side of said valve casing unit, said tubing units including mountings comprising a pair of duplicate opposed brackets one being integral with said mouth piece tubing, the other being integral with said bell tubing, each said mountings being adapted to embrace the valve casing unit, and means connecting said brackets to tighten said brackets against said valve casing unit, whereby the parts comprising the instrument are assembled into a unitary structure.

2. A valved wind instrument comprising a valve casing unit having three interconnected casings with piston valves slidably disposed therein, a curved tube terminating in a bell mounted on one side of said valve casing unit and detachably connected to the third casing of said unit, a second curved tube, including a slide, and terminating in a mouth piece mounted on the opposite side of said valve casing unit and detachably connected to the first casing of said unit, the mounting for said curved tubes comprising a pair of duplicate opposed brackets, one of said pair being fixed to said first curved tube and the other of said pair being fixed to said second curved tube, and each bracket being adapted to embrace the valve casing unit on opposite sides thereof, and means connecting said brackets to tighten said brackets against said valve casing unit, whereby the parts comprising the instrument are assembled into a unitary structure.

3. A valved wind instrument including first, second, and third prefinished sub-assemblies, said first sub-assembly including a plurality of interconnected tubular valves, said second sub-assembly including a mouthpiece tubing unit having a portion adapted to be connected to one of said valves and a mounting portion, said third sub-assembly including a bell and tubing unit having a portion adapted to be connected to another one of said valves and a mounting portion, said mounting portions of said second and third sub-assemblies being constructed to embrace said tubular valves on opposite sides thereof, and means interconnecting said mounting portions to hold the same tightly against said tubular valves and thereby secure said sub-assemblies together as a unitary structure.

4. A valved wind instrument including first, second, and third prefinished sub-assemblies, said first sub-assembly including a plurality of interconnected tubular valves, said second sub-assembly including a mounting portion and a mouth-piece tubing unit having a slide and a portion adapted to be connected to one of said valves, said third sub-assembly including a mounting portion and a tubing unit having a bell and a portion adapted to be connected to another one of said valves, said mounting portions of said second and third sub-assemblies being constructed to embrace said tubular valves on opposite sides thereof and including interconnecting means for holding the same tightly against said tubular valves and thereby securing said sub-assemblies together as a unitary structure.

References Cited in the file of this patent

UNITED STATES PATENTS

| 1,328,038 | Enders | Jan. 13, 1920 |
|---|---|---|

FOREIGN PATENTS

| 558 | Great Britain | 1855 |
|---|---|---|
| 2,729 | Great Britain | Nov. 19, 1856 |
| 11,837 | Great Britain | May 24, 1904 |